July 27, 1937.  C. TAPPAN  2,088,220
SOUND REPRODUCING SYSTEM
Filed Dec. 16, 1932
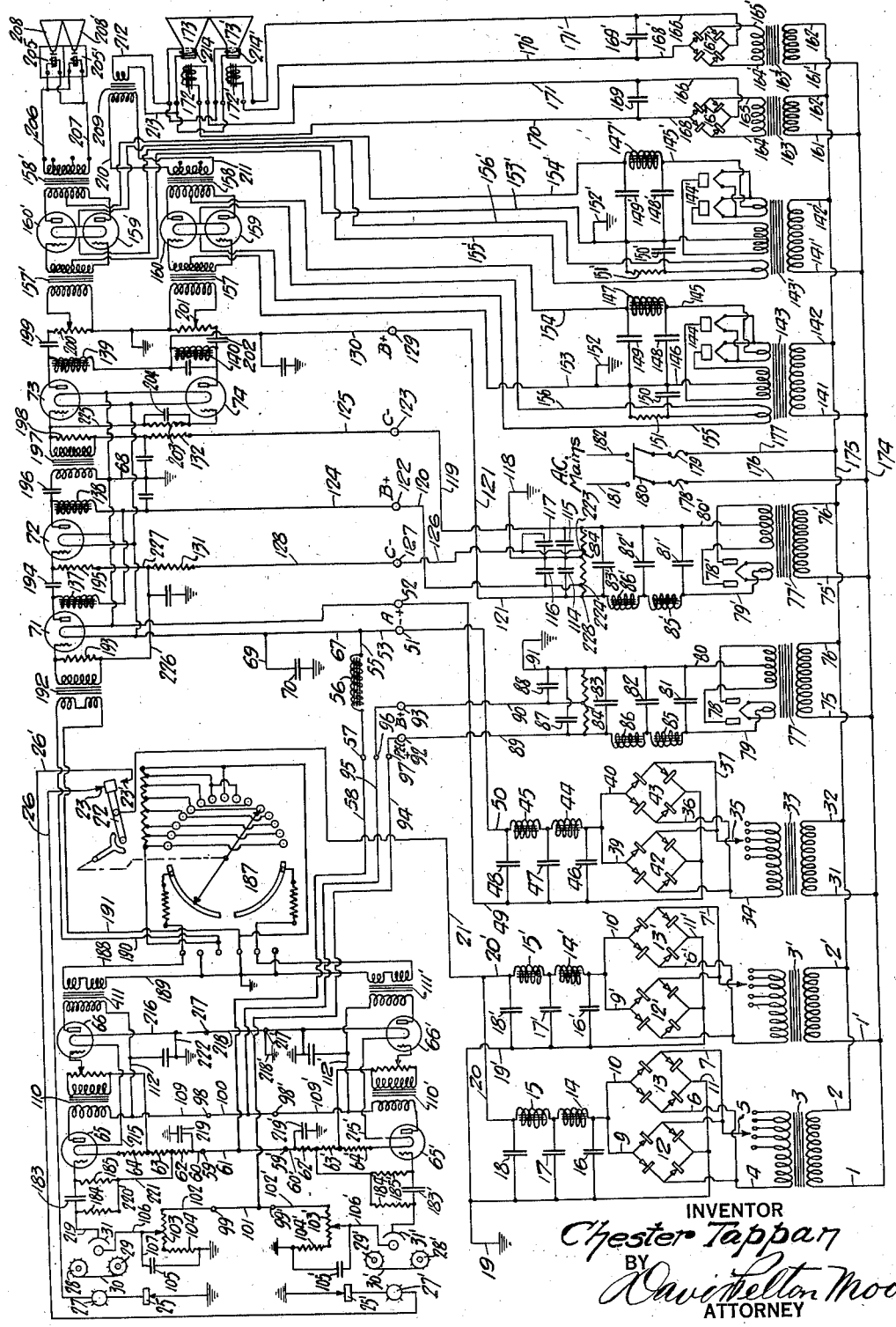
INVENTOR
Chester Tappan
BY
Davi Helton Moore
ATTORNEY Patented July 27, 1937

2,088,220

UNITED STATES PATENT OFFICE 2,088,220

SOUND REPRODUCING SYSTEM

Chester Tappan, New York, N. Y., assignor to General Talking Pictures Corporation, New York, N. Y., a corporation of Delaware Application December 16, 1932, Serial No. 647,690

3 Claims. (Cl. 179—100.3)

The present invention relates to improvements in sound reproducing systems, one object of the invention being the provision of a system operated from an alternating current source so as to displace or replace storage batteries with a source, a supply derived from commercial alternating current circuits, and so arrange the component parts as to produce the necessary and desired results, that is, to produce a supply of rectifier current in the system which is practically as constant as the supply from the storage batteries.

Another object of this invention is the provision of a system of this character in which the installation is exceedingly simple so as to produce a commercially successful system.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing is illustrated and shown a diagrammatic view of a complete sound reproducing system made according to and embodying the present invention.

Referring to drawing:

The leads 181 and 182 constitute the alternating current mains. From here this current is passed through main switch 180 which turns all the power on or off, through fuses 178 and 179, through leads 176 and 177 to leads 175 and 174 which are common, to the primaries of all power transformers. These leads in turn connect through leads 1 and 2 to the primary of power transformer 3, from the secondary of this transformer through leads 4 and 5 to rectifier unit 12, and through leads 6 and 7 to rectifier unit 13. You will note that these rectifiers are arranged in the conventional manner so that the alternating current will only flow through the correct path, and the output on these rectifiers is pulsating direct current. The output of rectifier 13 is connected to the output of rectifier 12 through leads 10 and 11. The output of rectifier 12 in turn is connected through lead 9 to choke 14, and through leads 8 and 19 to ground. The current then passes through choke coils 14 and 15, through lead 20 to lead 21. The condensers 16, 17 and 18 are connected in such a manner and in conjunction with choke coils 14 and 15 act as a conventional type of filter or smoothing circuit.

Referring now to leads 1' and 2' following through rectifiers 12' and 13' to leads 19' and 20' which in turn are connected to ground and to lead 21 respectively, we have a duplicate circuit throughout, the output of which is, as mentioned, parallel to the output of the first supply system. Lead 21 is connected to the common point of switch 22 which transfers from contact 23 to 23' or vice versa and hence through lead 26 or 26' to exciting light 27 or 27', the other side of which is connected through switch 25 or 25' to ground, thereby completing the circuit.

Coming back to leads 31 and 32 connecting the alternating current source of supply to the primary of power transformer 33, the secondary of which is connected through leads 34 and 35 and through leads 36 and 37 to rectifier elements 42 and 43 respectively. The output of these rectifiers is connected in parallel through leads 39 and 40 and 38 and 41 through choke coil 44 and lead 49, through choke coil 44 and choke coil 45 to lead 50. Condensers 46, 47 and 48 are so inter-connected in conjunction with choke coils 44 and 45 so as to act as a conventional filter or smoothing circuit. Lead 49 connects to the terminal 52 and lead 50 connects to the terminal 51. Lead 54 connects terminal 52 to one side of the filaments of the vacuum tubes 71, 72, 73 and 74. It also connects through lead 68 to ground. Terminal 51 is connected through leads 53 and 67 to the other side of filament tubes 71, 72, 73 and 74, thereby completing the filament circuit for the tubes just mentioned. It is also connected through lead 69 to condenser 70 the other side of which is connected to ground. This minus-A circuit is also connected through lead 55 to choke coil 56, from choke coil 56 to terminal 57 hence through lead 58 to terminal 59' and through lead 61 to terminal 59, from terminal 59 through lead 60 to resistance 62, hence through resistor 63, through resistor 64 to filament of tube 65; from the other side of the filament of this tube through lead 215 to the filament of tube 66, the other side of which is connected through lead 216 to terminal 217 then through lead 218 to terminal 217', through lead 218' to ground, completing the circuit. The above circuit is duplicated from terminal 59' through lead 60', resistors 62', 63', 64' to tubes 65' and 66' hence back to 217' and through 218' to ground. This gives us our low voltage filament supply for the tubes of the photocell amplifiers. It will be further noted that this circuit is by-passed to ground through condensers 219 and 219' to ground Leads 161 and 162 connect to the primary of transformer 163, the secondary of which is connected to leads 164 and 165, to rectifier 167 the output of which is connected to leads 168 and 166 to condenser 169, which acts as a filter or smoothing condenser hence through leads 170 and 171 to the field 172 of the dynamic speaker 173. You will further note that this circuit is duplicated for dynamic speaker 173'.

The high voltage or "B" supply for the photo cells, photo cell amplifiers and intermediate amplifiers will now be described. Leads 75 and 76 are connected to primary of transformer 77. The high voltage winding is connected as shown to plates of tube 78, filament of which is connected to the low voltage winding on the secondary of transformer 77. The mid-point of this low voltage winding is connected through lead 79 to choke coil 85. The mid-point of the high voltage winding is connected through lead 80, one side of condensers 81, 82 and 83, one side of voltage divider 84, one side of condenser 87, one side of condenser 88, hence through lead 91 to ground. Lead 79 as well as connecting to choke 85 also connects to the other side of condenser 81. Choke coil 85 is then connected to choke coil 86 and the other side of condenser 82. The other side of choke coil 86 is connected to the other side of condenser 83 and to the other side of voltage divider 84, to the other side of condenser 87 and through the lead 89 to the plus "P. E. C." terminal 92. A tap on voltage divider 84 is led to the other side of condenser 88, hence through lead 90 to plus "B" terminal 93 on the intermediate amplifier. You will please note that the combination as shown, of choke coils 85 and 86, condensers 81, 82, 83, 87 and 88 and voltage divider 84 is the conventional type of filtering or smoothing system and distribution system. From terminal 92 on the intermediate amplifier the current is then led to terminal 97, from here through lead 94, to terminal 99', through lead 101 to terminal 99 through lead 102 to one side of potentiometer 103, the other side of which is connected through resistor 104 to ground. The adjustable point on potentiometer 103 is led through lead 107 to condenser 105, the other side of which is grounded. This variable point is also led through lead 106 to photo cell 31 the other side of which is connected through lead 219 to one side of resistor 184 through leads 220 and 221, through resistors 63 and 64 to filament of tube 65 and through lead 215, through filament of tube 66 through leads 216 and 222 to ground. From terminal 99' we duplicate the circuit through lead 102' to potentiometer 103' etc. This is for the second photo cell. From terminal 93 connected through to terminal 96 through lead 95 to terminal 98' through lead 100 to terminal 98, through lead 109 to the primary winding of transformer 110 and through lead 112 to the primary of transformer 111. The other side of this winding of transformer 110 goes to the plate of tube 65 hence to filament of tube 65 through lead 215 and through filament of tube 66 through lead 216 and lead 222 to ground. From the other side of the primary winding on transformer 111 current passes to the plate of tube 66 hence to the filament of tube 66 to leads 216 and 222 to ground. From terminal 98' through lead 109' etc. This circuit is duplicated for the plate supply of the other photo cell amplifier.

Leads 75' and 76' are connected to the primary of transformer 77'. The high voltage winding of this transformer is connected to the plates of tube 78' as shown. The low voltage winding is connected to the filament of this tube The mid-point of this low winding is connected by lead 79', to choke coil 85'. The mid-point of the high voltage winding is connected through lead 80' to one side of condensers 81', 82' and 83', and one side of voltage divider 84' and one side of condenser 115. Lead 79' also connects to the other side of condenser 81'. The other side of choke coil 85' is connected to choke coil 86' and to the other side of condenser 82'. The other side of the choke coil 86' is connected to the other side of condenser 83' and to the other side of the voltage divider 84', also to one side of condenser 114. This constitutes the usual rectifier and filter combination or smoothing circuit and voltage distributor. At a point part way up the voltage divider 84' is connected to the other side of condenser 114' and the other side of condenser 115, and to one side of condensers 116 and 117, through lead 118 to ground. Lead 89' as previously pointed out connects to one side of voltage divider 84' and from here through lead 119 to terminal 123 on the intermediate amplifier. A point on the voltage divider 223 is connected through lead 126 to the other side of condenser 117 and hence to terminal 127. Point 224 on the voltage divider is connected through lead 120 to the other side of condenser 116 and to terminal 122 of the intermediate amplifier. Point 228 is connected through lead 121 to terminal 129 of the intermediate amplifier. Terminal 123 of the intermediate amplifier is connected through lead 125, through suppressor resistor 132 to the secondary of transformer 197 and to one side of resistor 198, the other side of which is connected to grid of tube 73 and through lead 225 and through resistor 203 to the grid of tube 74. Terminal 127 of the intermediate amplifier is connected through lead 128, through resistor 131, through lead 226, through resistor 193, and through the secondary of transformer 192 to the grid of tube 71, through lead 227 and through resistor 195 to the grid of the tube 72. These two circuits complete the C bias arrangement for the tubes of the intermediate amplifier. Terminal 122 is connected through lead 124, through choke coil 138 to plate tube 72 and through choke coil 137 to plate of tube 71, hence to filaments of tubes 72 and 71 respectively, hence back to ground through lead 68. Terminal 129 is connected through lead 130 and through choke coils 139 and 140 to plates of tubes 73 and 74 respectively, hence through the filaments of these tubes back to ground through lead 68. This completes the B circuits for the intermediate amplifier.

Leads 141 and 142 are connected to the primary of transformer 143 the secondary of which has three windings. One low voltage winding is connected through leads 155 and 156 to the filaments of tubes 159 and 160. The mid-point of this winding is connected through resistor 151 to ground 152. The mid-point is also connected to one side of condenser 150 the other side of which is connected to ground. This is the grid biasing resistor. The other low voltage winding is connected to the filaments of the rectifier tubes 144 the mid-point of which is connected through lead 145 to choke coil 147. The high voltage winding on the secondary transformer 143 is connected to the plates of the rectifier tubes 144. The mid-point of this high voltage winding is connected through leads 146 and 152 to ground. It is also connected to one side of condensers 148 and 149. The ground is then carried through lead 153 to the mid-point of the secondary of transformer 157 and hence through this transformer to the grids of tubes 159 and 160. At the same point on choke 147 where lead 145 connects with this choke coil it is also connected to the other side of condenser 148, and the other side of this choke coil 147 is connected to the other side of condenser 149, hence the B voltage is connected through lead 154 to the mid-point of the primary of transformer 158 hence to the plates of tubes 159 and 160, from the plates to the filaments and from the filaments back to ground, thereby completing the circuit. This rectifier just described, plus the amplifier constitute a single unit; in other words, a complete power amplifier with its power supply.

Referring to leads 141' and 142', transformer 143' etc., and including duplicate amplifier as shown directly above one previously described, constitutes the second complete power amplifier including its own power supply. You will further note that these constitute the usual power supply rectifier filtering and smoothing circuit and amplifying circuit.

*The operation.*—The previously described method of lighting the exciting lamps 27 and 27' is used. You will note the film advancing mechanisms 28 and 29 and 28' and 29', also optical systems interposed for focusing the light on film 30. For a matter of convenience one machine only is described. The film 30 with the usual sound track is interposed between the exciting lamp 27, optical system, and, the photo cell 31 wherein the changes in the light intensity on photo cell 31 cause the fluctuation in the current passed by cell 31, and from here out through lead 219 to condenser 183 and hence to grid tube 65. The other side of the photo cell is connected through leads 106 and 107 through condenser 105 and lead 108 to ground, this side of the circuit being carried through on "ground" throughout the entire circuit. Grid of tube 65 is thereby registering the difference in potentiality also across resistor 185. From tube 65 through transformer 110 to grid of tube 66 through transformer 111, through leads 188 and 189, through attenuator 187, through leads 190 and 191, through transfomer 192 to grid of tube 71, through condenser 194 to grid of tube 72, through condenser 196 and through transformer 197 to grid of tube 73 and parallelled through lead 225 and resistor 203 and condenser 204 to grid of tube 74. The output of tube 73 is connected through condenser 199 and potentiometer 200 to transformer 157', the secondary of this transformer is connected to the grids of tubes 159' and 160'. The plates of these tubes are connected through transformer 158' and through leads 206 and 207 to magnetic speakers 205 and 205'. These units are on horns 208 and 208'. Duplicating the circuit from tube 74 connected through lead 140 to condenser 202 and to potentiometer 201 hence through transformer 157 to grids of tubes 159 and 160, from the plates of these tubes through transformer 158, and through leads 210 and 211, to a step-down transformer 209, hence through leads 212 and 213 to the voice coils 214 and 214' of dynamic units 173 and 173'.

From the foregoing description taken in connection with the drawing it is evident that there is here illustrated and described a system for reproducing sound from a photographic film as in theatrical and educational installations, that includes a source of illumination, the necessary photo electric cell, photographic sound record with its operating mechanism so that the film travels between the source and the cell, a source of alternating current and means for rectifying and filtering the same for said source of illumination, a filter being arranged to reduce the variations in the current supply of said source of illumination to such an extent that the effect of such variations is less than the effect of variations in the remainder of the system. Thus the alternating current from the usual lighting mains could be utilized in lieu of storage batteries for operating the complete sound reproducing system. The rectified current being used in this instance for the exciter lamp, the photoelectric cell for the necessary amplifiers and for the loud speakers, there being filters disposed throughout the system and operated from the source of alternating current to reduce the variations in said current. By this means a satisfactory reproduction of sound is produced without the usual noise due to alternating current or rather the irregularities therein, as would be the case if raw alternating current were used instead of a rectifier current as in the present instance.

What is claimed is:

1. In a sound reproducing system, the combination with an alternating current main and a plurality of rectifiers connected therewith, a photographic sound record, means to progressively move said record, an exciter lamp and a photoelectric cell between which said record passes, a filter interposed between the exciter lamp and one of the rectifiers, a thermionic amplifier controlled from said photoelectric cell, and a filter interposed between another of said rectifiers and the photoelectric cell, and also connecting the filaments of the thermionic tubes of said amplifier to the same rectifier to which the photoelectric cell is connected.

2. A sound reproducing system as claimed in claim 1 wherein a thermionic power amplifier is connected to the output of the cell controlled thermionic amplifier, filters disposed between another of said rectifiers and connecting the filaments of the thermionic tubes of the power amplifier and a filter interposed between a fourth rectifier and the transformers and grid and plate elements of the power amplifier.

3. A sound reproducing system as claimed in claim 1 wherein a power amplifier is connected to the output of the cell controlled thermionic amplifier, a filter connected to a third rectifier and to the transformers and plate elements of the power amplifier, a filter connected between a fourth rectifier and the filaments of the thermionic tubes of the power amplifier, a loud speaker connected to the output of the power amplifier and having its exciting coil connected through a fifth rectifier.

CHESTER TAPPAN.